(12) United States Patent
Hulsey

(10) Patent No.: US 7,861,705 B2
(45) Date of Patent: Jan. 4, 2011

(54) VERTICAL FOOD SMOKER/COOKER

(76) Inventor: William C. Hulsey, 1978 Trimbleston Pl., Mt. Pleasant, SC (US) 29464

( * ) Notice: Subject to any disclaimer, the term of this patent is extended or adjusted under 35 U.S.C. 154(b) by 374 days.

(21) Appl. No.: 12/069,593

(22) Filed: Feb. 12, 2008

(65) Prior Publication Data
US 2009/0199839 A1 Aug. 13, 2009

(51) Int. Cl.
A47J 27/00 (2006.01)
F24C 5/20 (2006.01)
(52) U.S. Cl. ............... 126/25 A; 126/25 R; 126/273 R; 126/369; 126/9 R; 126/38; 99/417; 99/448; 99/481; 99/482; 99/449; 432/162; 432/177
(58) Field of Classification Search ............... 126/25 A, 126/25 R, 9 R, 358, 38, 41 R; 99/417, 448; 432/162, 177
See application file for complete search history.

(56) References Cited

U.S. PATENT DOCUMENTS

| 237,151 | A | 2/1881 | Williams |
|---|---|---|---|
| 522,797 | A | 7/1894 | Metcalf |
| 943,569 | A | 12/1909 | Scamardi |
| 1,298,762 | A | 4/1919 | Milligan |
| 1,448,900 | A | 3/1923 | Moats |
| 1,544,651 | A | 7/1925 | Klinert |
| 1,669,127 | A | 5/1928 | Houston |
| 1,779,867 | A | 10/1930 | Ahrold |
| D91,639 | S | 2/1934 | Stulik |
| 2,026,387 | A | 12/1935 | Jackes et al. |
| D99,126 | S | 3/1936 | Huntington |
| 2,048,226 | A | 7/1936 | Lang |
| 2,094,915 | A | 10/1937 | Dawson |
| 2,154,165 | A | 4/1939 | Huntington |
| D116,964 | S | 10/1939 | Robinson |
| 2,221,098 | A | 11/1940 | Langsam |
| D125,446 | S | 2/1941 | Jone, Jr. et al. |
| D134,572 | S | 12/1942 | Wolcott |
| D135,324 | S | 3/1943 | Pearson |
| 2,349,617 | A | 5/1944 | Gorman |
| D139,850 | S | 12/1944 | Frenning |

(Continued)

OTHER PUBLICATIONS

Brochures for Vertical Cooking System, Phase 2, LLC, St. Louis, Missouri, United States.

(Continued)

*Primary Examiner*—Steven B McAllister
*Assistant Examiner*—Nikhil Mashruwala

(57) ABSTRACT

A vertical food cooker includes: (a) an open-bottomed upper warming portion including: a support frame, a temperature measuring gauge, an adjustable upper air vent, and an openable cooker lid, the support frame including a substantially cylindrical-shaped upper collar and at least two spaced apart rails extending generally downward from the upper collar; (b) a cooker base portion including: a burn chamber, an adjustable base damper to the burn chamber, a substantially planar fire pan at a bottom of the otherwise bottomless burn chamber, and at least three legs; (c) a cooker mid portion between the upper warming portion and the base portion, the mid portion including between about one and about six substantially cylindrically shaped, open-bottomed, independently openable, stacked cooking drawers; and (d) grate brackets attached to the support frame, each of the cooking drawers, and the burn chamber; grill grates being supportable on the grate brackets. An expandable base unit vertical food cooker and a cooker add-on kit are also included.

6 Claims, 10 Drawing Sheets

U.S. PATENT DOCUMENTS

| | | | |
|---|---|---|---|
| D142,417 S | 9/1945 | Jones | |
| D143,360 S | 12/1945 | Stempel et al. | |
| 2,446,063 A * | 7/1948 | Cameron | 219/457.1 |
| 2,509,284 A | 5/1950 | Allen | |
| D163,531 S | 6/1951 | McCarron | |
| D164,554 S | 9/1951 | Dailey | |
| 2,666,426 A | 1/1954 | Pollard | |
| D179,943 S | 3/1957 | Ipsen | |
| D179,958 S | 3/1957 | Vincent | |
| 2,787,995 A | 4/1957 | Alter | |
| 2,792,773 A | 5/1957 | Barker | |
| 2,797,633 A | 7/1957 | Goodwin | |
| D180,740 S | 8/1957 | Lowry | |
| D182,743 S | 5/1958 | Rodman | |
| 2,860,624 A | 11/1958 | Eddy | |
| D185,280 S | 5/1959 | Greenblat | |
| D186,704 S | 11/1959 | Schwieso | |
| 2,920,614 A | 1/1960 | Phelps | |
| D198,822 S | 8/1964 | Lyemance | |
| D200,137 S | 1/1965 | Hanna | |
| D201,416 S | 6/1965 | Sazegar | |
| D202,751 S | 11/1965 | Sundholm | |
| 3,224,357 A | 12/1965 | Rubens | |
| 3,330,266 A | 7/1967 | Stephen | |
| D209,491 S | 12/1967 | Kostial | |
| D217,184 S | 4/1970 | Davis | |
| 3,683,150 A * | 8/1972 | Kehl ey al. | 219/200 |
| 3,759,164 A | 9/1973 | Robinson | |
| 3,765,397 A | 10/1973 | Henderson | |
| D237,856 S | 12/1975 | Madson et al. | |
| 3,946,651 A | 3/1976 | Garcia | |
| 3,957,455 A | 5/1976 | Clark | |
| 3,964,463 A | 6/1976 | Dailey | |
| D244,249 S | 5/1977 | Boswell et al. | |
| 4,105,013 A | 8/1978 | Vache | |
| D258,108 S | 2/1981 | Cone | |
| D259,386 S | 6/1981 | Mulder | |
| D261,975 S | 11/1981 | Sauls | |
| D268,867 S | 5/1983 | Sanderson et al. | |
| 4,452,132 A | 6/1984 | Miller et al. | |
| 4,498,452 A | 2/1985 | Schlosser et al. | |
| 4,616,625 A | 10/1986 | Froome | |
| D288,843 S | 3/1987 | Barnes | |
| 4,688,543 A | 8/1987 | Kopke | |
| 4,705,020 A | 11/1987 | Hahn | |
| 4,747,392 A | 5/1988 | Rogers | |
| 5,036,832 A | 8/1991 | Schlosser et al. | |
| D325,317 S | 4/1992 | Ruth | |
| 5,168,796 A | 12/1992 | Porton et al. | |
| 5,184,599 A | 2/1993 | Stuart | |
| 5,216,947 A * | 6/1993 | Cheng | 99/417 |
| D340,613 S | 10/1993 | Kesling | |
| D341,988 S | 12/1993 | Endres | |
| 5,404,803 A | 4/1995 | Glucksman | |
| 5,473,979 A * | 12/1995 | Ruben | 99/446 |
| 5,531,154 A | 7/1996 | Perez, III | |
| D374,371 S | 10/1996 | Hall McDonald | |
| D375,347 S | 11/1996 | Whalen et al. | |
| 5,584,235 A | 12/1996 | DuBois et al. | |
| D377,136 S | 1/1997 | Knuth | |
| D379,900 S | 6/1997 | Gillam et al. | |
| D380,932 S | 7/1997 | Duray | |
| 5,653,161 A | 8/1997 | Nopanen et al. | |
| D402,499 S | 12/1998 | Carroll | |
| 5,970,852 A | 10/1999 | Bourgeois | |
| D427,484 S | 7/2000 | Ethridge | |
| D429,952 S | 8/2000 | Cragg | |
| D430,772 S | 9/2000 | Ganard | |
| D435,191 S | 12/2000 | Cooper | |
| D435,387 S | 12/2000 | Pai | |
| D442,819 S | 5/2001 | Masters | |
| D443,464 S | 6/2001 | Davis | |
| D443,793 S | 6/2001 | Ethridge | |
| D453,372 S | 2/2002 | Pecoskie | |
| D457,775 S | 5/2002 | Peloquin | |
| D459,938 S | 7/2002 | Pai | |
| D460,893 S | 7/2002 | Rowe | |
| D470,356 S | 2/2003 | Kipps | |
| 6,543,435 B1 * | 4/2003 | Regen et al. | 126/25 R |
| D481,256 S | 10/2003 | Bossler | |
| D481,903 S | 11/2003 | Hester | |
| D486,348 S | 2/2004 | Zhu | |
| D493,328 S | 7/2004 | Wood | |
| D502,055 S | 2/2005 | Martin et al. | |
| D510,835 S | 10/2005 | Pai | |
| D523,684 S | 6/2006 | Dowst et al. | |
| 7,150,278 B1 * | 12/2006 | Hampton | 126/38 |
| 2007/0079937 A1 | 4/2007 | Lahmann et al. | |

OTHER PUBLICATIONS www.luxgrill.com
www.visiongrill.com (under construction)
www.chuckwagonbrands.com (under construction).
Pending U.S. design patent application of William C. Hulsey by Legal Zoom.

* cited by examiner

US 7,861,705 B2

VERTICAL FOOD SMOKER/COOKER

BACKGROUND OF THE INVENTION

1. Technical Field

The present invention relates to a vertical outdoor cooker for smoking or otherwise cooking or warming one or more food items in the cooker using smoke and/or heat from a heat source in a base of the cooker, more particularly to an expandable vertical food cooker to which cooking drawers can be added for increased capacity, or removed for decreased capacity.

2. Background Information

Outdoor barbecuing is an art form in the South, and apparently in other areas of the country as well. Rabid barbecue fans compete in "Best BBQ" cook-offs, each claiming to have the tastiest secret recipe barbecue sauces and meat rubs. The food cooker of the present invention is an effective outdoor smoker for barbecuing meats and for cooking various other food items.

Advantages of the vertical food cooker of the present invention include the following: 1) its stacked, tight fitting cooking drawers and generally vertical shape permit high capacity and versatility; 2) its small footprint means that it does not occupy a great deal of floor space on a patio or deck, for example; 3) its removable grill grates are easy to clean and can be removed for accommodating larger cuts of meat or other foods in the cooker. A vertical food cooker that can be expanded or reduced in size as desired is particularly useful for the home or professional chef. Cooking drawers can be added to the expandable vertical food cooker of the present invention for increased capacity, and later removed for decreased cooking capacity, as desired.

BRIEF SUMMARY OF THE INVENTION

The present invention is a vertical cooker for smoking or otherwise cooking one or more food items, which includes: (a) an open-bottomed upper warming portion comprising: a support frame, a temperature measuring gauge, an adjustable upper air vent, and an openable cooker lid on the support frame, the support frame comprising a substantially cylindrical-shaped upper collar and at least two spaced apart rails attached to and extending generally downward from the upper collar; (b) a cooker base portion below the upper warming portion, the base portion comprising: a burn chamber, an adjustable base damper to the burn chamber, a substantially planar fire pan at a bottom of the otherwise bottomless burn chamber, and at least three support legs; (c) a cooker mid portion between the upper warming portion and the base portion, the cooker mid portion comprising between about one and about six substantially cylindrically shaped, open-bottomed cooking drawers, the independently openable cooking drawers being stacked above one another; and (d) a plurality of grate brackets, at least three sets of at least two each of the grate brackets being attached to the support frame, each of the cooking drawers, and the burn chamber. At least one removable grill grate is supportable on each set of grate brackets. Although it can be used indoors, the cooker of the present invention is preferably intended for outdoor use, most preferably as a barbecue smoker for smoking various cuts of meats.

An expandable base unit vertical food cooker and a cooker add-on kit are also included herein. The cooker add-on kit includes: (a) a support frame; (b) at least one cylindrically shaped, open-bottomed cooking drawer, the cooking drawer comprising a grill support device on an inside wall of the cooking drawer, the at least one cooking drawer comprising a substantially vertically oriented hinge pin channel on a wall of the cooking drawer, the hinge pin channel supporting a hinge pin within the hinge pin channel, an end of the hinge pin protruding from the hinge pin channel; (c) at least one removable grill grate supportable on the grill support device, and (d) a cooker rear skin. A grill support device is attached to the support frame. The support frame includes a substantially cylindrical-shaped upper collar and at least two spaced apart rails attached to and extending generally downward from the upper collar.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
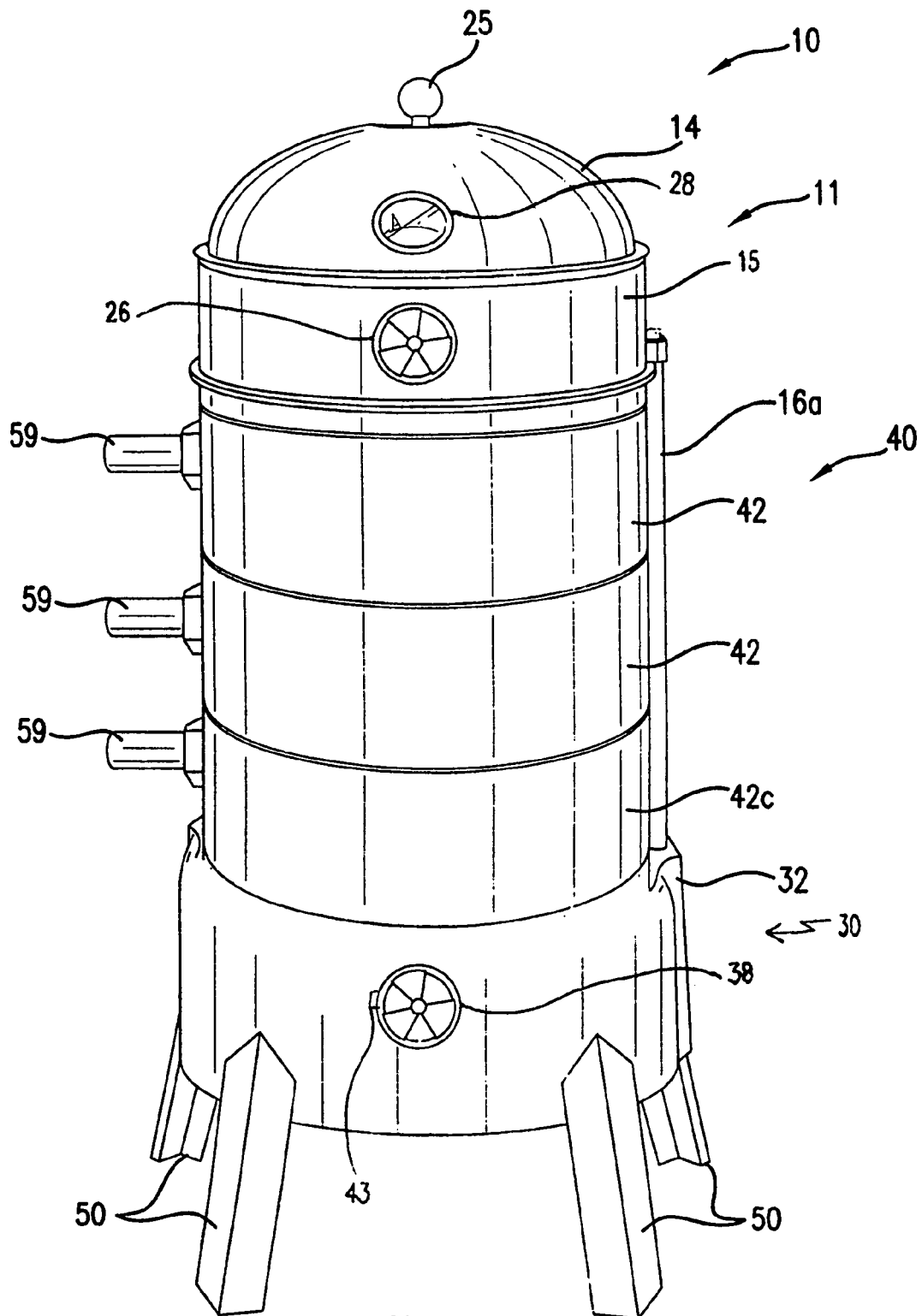
FIG. 1 is a perspective view of a vertical food cooker according to the present invention.

In the following description, like reference characters designate like or corresponding parts throughout the several views. Also, in the following description, it is to be understood that such terms as "front," "within," and the like are words of convenience and are not to be construed as limiting terms. Referring in more detail to the drawings, the invention will now be described.

Figure 2:
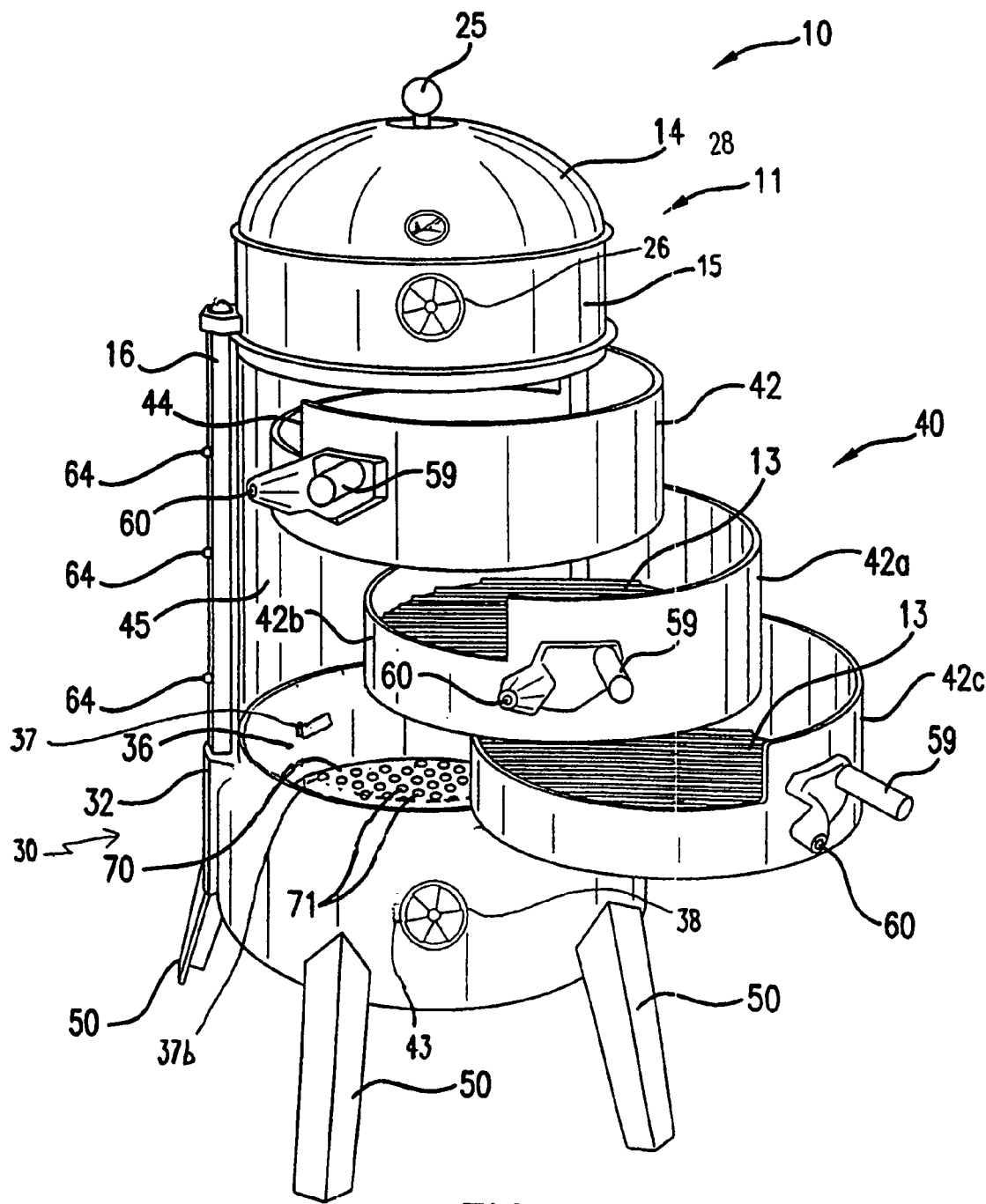
FIG. 2 is a perspective view of the vertical food cooker according to FIG. 1, showing three open cooking drawers.
Figure 3:
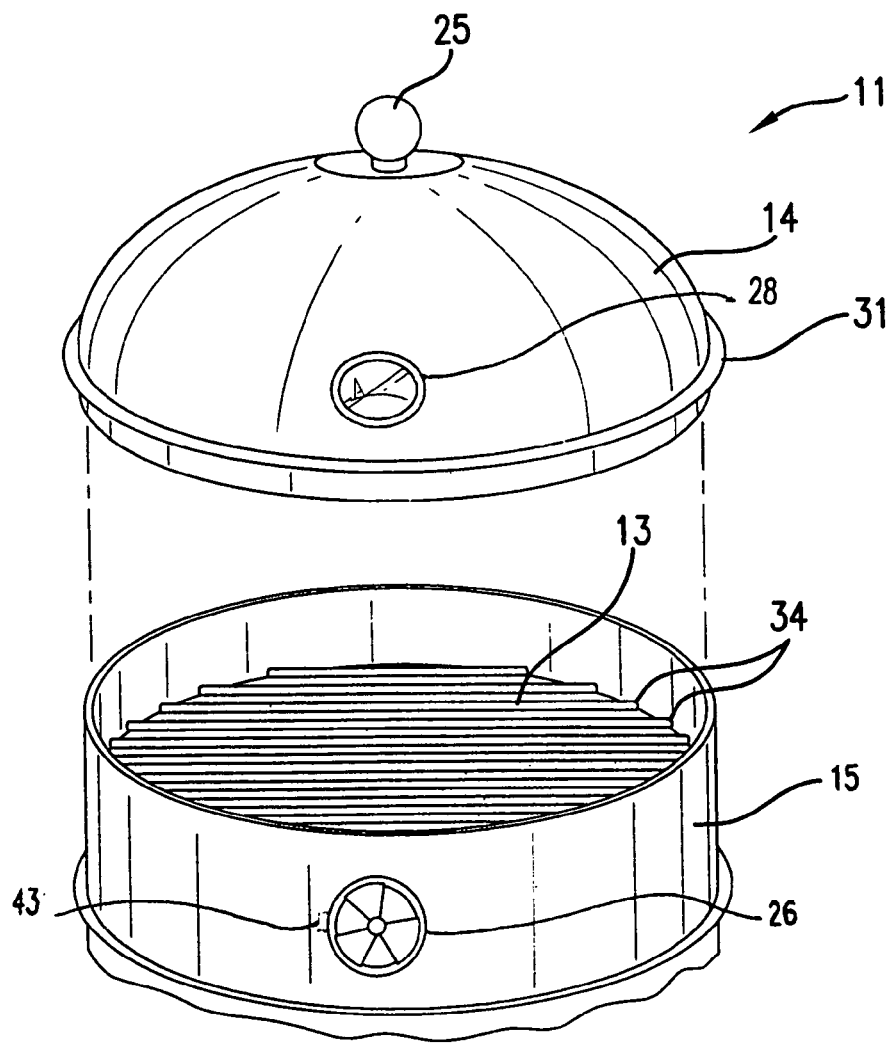
FIG. 3 is a perspective view of an upper warming portion of a vertical food cooker according to the present invention.
Figure 4:
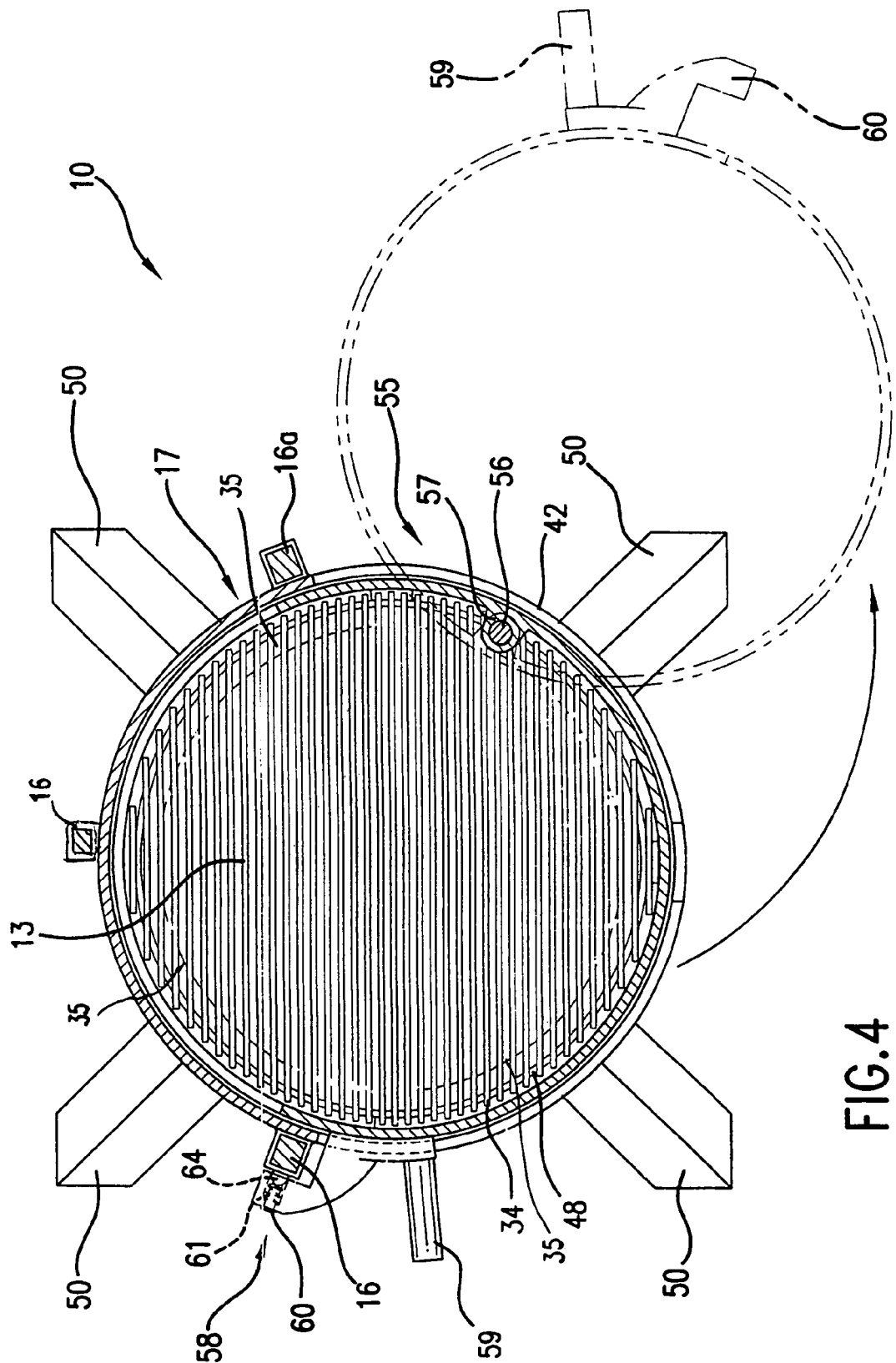
FIG. 4 is a top plan view of a cooking drawer of a vertical food cooker according to the present invention.
Figure 5:
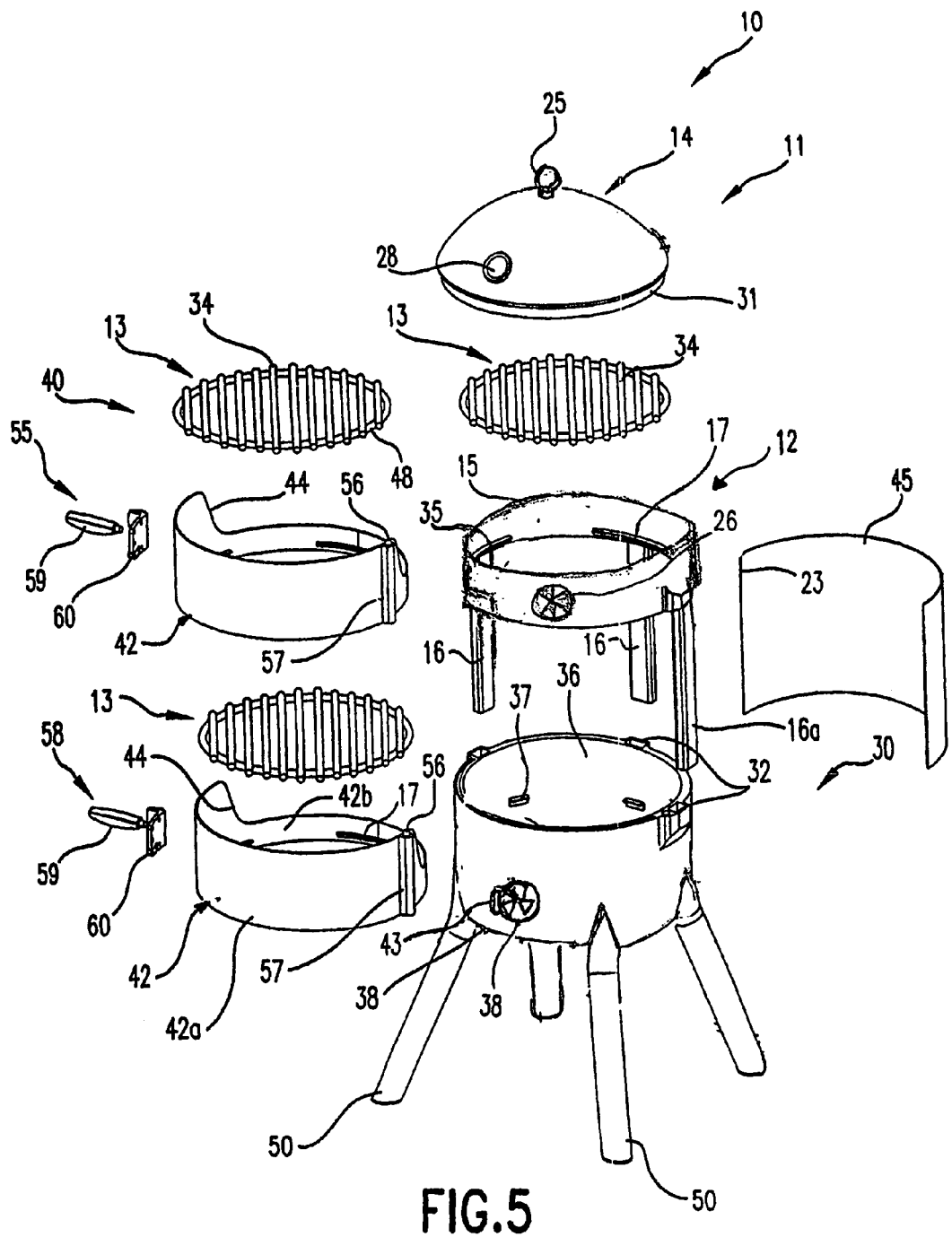
FIG. 5 is an exploded view of a vertical food cooker according to the present invention.

Referring to FIGS. 1 through 5, a substantially vertical cooker apparatus, or cooker, according to the present invention, generally referred to as 10 herein, for cooking at least one food item, and preferably a number and variety of meats, vegetables, seafood, and/or other food items outdoors at the same time. As seen in FIGS. 1, 2, and 5, an uppermost, open-bottomed, warming portion 11 of the vertical cooker 10 comprises: a support frame 12, an openable cooker lid 14 supported on the upper edge of the support frame 12, a grill support device 17 attached to the support frame 12, and a removable grill grate 13 supported by the grill support device 17. The support frame 12 comprises a substantially cylindrically shaped upper collar 15, and at least two, and preferably three, spaced apart rails 16 extending down in a generally vertical direction from the generally horizontally oriented upper collar 15 (see FIG. 5). The rails 16 are preferably the same size as one other. An upper end of each rail 16 is attached to the upper collar 15. The grill support device 17 is preferably attached to the inside wall of the upper collar 15, with a removable grill grate 13 resting on it. The removable grill grate 13 in the upper warming portion 11 is bounded by the upper collar 15.

Continuing with the upper warming portion 11, the vertical food cooker 10 preferably also includes a temperature measuring device with a gauge 28. The temperature gauge 28 is on the upper side wall of the cooker, or in the cooker lid 14 as seen in FIGS. 1-3, so that it can be read by a person standing next to the cooker. Maintenance of internal temperature within the cooker 10 within an appropriate temperature range helps to achieve a properly cooked product and consistent results.

Temperature and smoke inside the cooker 10 during the cooking process can be controlled in part using one or more adjustable upper air vents 26 in the cooker 10. The adjustable air vents 26 are in the cooker lid 14, or in the upper collar 15 as seen in FIG. 1 through 3. Preferably, an upper vent handle 29 connected to the upper air vent 26 or vents is moved (e.g., pushed, turned, or flipped) to close or open the upper air vent 26. Opening the upper air vent 26 permits smoke to exit and outside air to enter, which gradually lowers the internal temperature of the cooker 10. Closing the upper air vent 26 retains the smoke and heat in the cooker, so that food is cooked more thoroughly. Controlling smoke while barbecuing in the cooker is particularly important for achieving a consistent, desirable smokiness in barbecued food.

When the uppermost, removable grill grate 13 is removed from the upper warming portion 11, the center space of the cooker 10 can be accessed. The vertical food cooker 10 is versatile in that food items can be placed on the uppermost grill grate 13, which is supported in the upper warming portion 11 as seen in FIG. 3, or the uppermost grill grate 13 can be removed. When the grill grate is removed, a larger food item can be placed in the cooking drawer 42 below the upper warming portion 11, or a meat carcass, such as a whole hog, or the like can be hung from a hook or the like in the large central space of the cooker 10.

The removable cooker lid 14 includes a lid handle 25 affixed to the top of the lid. The lid handle 25 is used for placing the lid on the cooker 10 and for removing the lid from the cooker. Alternatively, the cooker lid 14 may be hinged to the top of the cooker 10. A lid lip 31 on the bottom of the cooker lid 14 fits closely into the upper edge of the upper collar 15. The cooker lid 14 is dome-shaped, so a larger food item, such as a chicken, can be placed on the uppermost grill grate 13 for holding and warming. Food can then be served from the uppermost grill grate 13, if desired, simply by removing the dome-shaped lid 14.

Food items that are cooked in the vertical food cooker 10, or cooked elsewhere, can be kept warm on the uppermost grill grate 13 in the spacious upper warming/holding portion 11 under the cooker lid 14 while the remaining food cooks below in the cooker 10. Some vegetables, such as tomatoes, or other foods that do not require direct heat in order to cook can be placed on the uppermost grill grate 13 and cooked. Foods like sauces and gravies can be warmed in a pot placed on the uppermost grill grate 13. Rolls and other breads, for example, can be warmed on the uppermost grill grate. The food items can be placed on the grill grate before or after the grill grate is placed in the cooker.

As shown in FIGS. 3 and 5, a preferred grill support device 17 includes a number of spaced apart grate brackets 35 attached along the inside wall of the upper collar 15 for supporting the grill grate 13 in a substantially horizontal position. The grate brackets 35 are preferably generally L-shaped (in transverse cross-section), the horizontal branch of the "L" shape being the generally horizontally oriented section and the vertical branch of the "L" shape being the generally vertically oriented section 19. Preferably, the generally vertically oriented section 19 of each of three or four evenly spaced grate brackets 35 is attached to the inner side wall of the upper collar, so the grate brackets 35 occur at a relatively even height about midway down the inside of the upper collar. In the cooker, the removable grill grate 13 rests on the outwardly extending, generally horizontally oriented section 18 of each of the spaced apart grate brackets 35. Each grate bracket preferably extends out about ½ inch to about one inch into the central space from the inside wall around the inner periphery of the upper collar. The uppermost grill grate 13 extends substantially horizontally across the cylindrical space bounded by the upper collar 15, as seen in FIG. 3.

The vertical food cooker 10 also includes a mid portion 40 between the upper warming portion 11 and a base portion 30 of the cooker. The cooker mid portion 40 includes between about one and about six substantially cylindrically shaped, open-bottomed, openable cooking drawers 42, and at least one generally vertical rail 16 adjacent the cooking drawers. The cooker 10 more preferably includes between two and five, most preferably three or four, of the cooking drawers 42. The generally cylindrically shaped cooking drawers 42 preferably have the same diameter at the base as one another. Their width may vary. The cooking drawers 42 are stacked substantially vertically on (i.e., on top of) one another one another. The bottommost cooking drawer 42c is above the cooker base portion 30, any second, midlevel drawer 42a is directly above the bottommost drawer 42c, and so forth, with the uppermost drawer 42 fitting under the upper warming portion 11. The cooking drawers 42 fit closely into the cooker 10, so that the heat and smoke are unlikely to seep out between the cooking drawers. Each cooking drawer 42 includes a grill support device 17 on an inside wall of the cooking drawer. Each of the substantially horizontally oriented cooking drawers 42 supports one of the generally circular-shaped, removable grill grates 13, with each grill grate being surrounded by the inside wall of each cooking drawer. Each cooking drawer 42 extends across the cooker from one side to the other, as seen in FIG. 2.

The cooking drawers 42 need not have the same height as one another, though they are preferably similarly shaped as seen in the three drawer cooker 10 illustrated in FIGS. 1 and 2, and the two drawer cooker 10 shown in FIG. 5. A large quantity of meat can be cooked in the heavy duty cooker 10. In a preferred three drawer, four or five foot tall cooker, for example, approximately 100 pounds of meat can be cooked at once. The cooker 10 can also be used indoors. For example, a three or four drawer cooker 10 can be placed in a restaurant kitchen under a hood and used to cook for many customers.

The rails 16 provide support for the vertical food cooker 10. At its upper end, the rail 16 is preferably bolted attached to the outside of the upper collar 15, as seen in FIGS. 1 and 2. At its lower end, the rail 16 of FIGS. 1 and 2 is inserted in, and may be bolted inside, a lower attachment section 32 of the cooker base portion 30. The lower end of the rail 16 contacts an upper end of the lower attachment section 32.

As seen in FIGS. 2 and 5, a rear skin 45 of the cooker 10 extends across the back of the cooker 10 between two rails 16 on opposite sides of the cooker. The rear skin 45 is ordinarily visible from the rear of the cooker, while the cooking drawers 42 can be seen from the front of the cooker 10. The outside surface of the rear skin 45 is preferably adjacent the inside surface of the rails 16, with an opposite side edge 23 of the rear skin 45 under each of the two opposite rails 16, 16a. When the cooking drawers 42 are closed, a rear of each cooking drawer 42 is adjacent the inside surface of the rear skin 45. The rear skin 45 extends behind, but not in front of, the cooking drawers 42, and prevents heat and smoke from escaping from the rear of the cooker 10. The rear skin 45 is preferably substantially rectangular in shape and made of stainless steel for durability.

The versatile vertical food cooker 10 can optionally be used with a varying number of grill grates 13, or none at all, as dictated by the size of the food item to be cooked and/or the desired level of cooking. The cooker lid 14 and uppermost grill grate 13 can be removed to access the cooker through the top of the cooker rather than using the drawers 42. Alternatively, a grill grate 13 (or two) can be removed from a position between two other grill grates 42 in order to accommodate a large food item, such as a turkey or chicken that will be cooked in a generally horizontal position (breast up).

The varying distances of the removable grill grates 13 and the substantially vertically stacked drawers 42 from the heat source in the burn chamber 36 allow a variety of meats, vegetables, and/or other food items to be cooked in the cooker 10, all at the same time or at graduated times. Skillful spacing of food items and planning ahead permit preparation of an entire meal for many guests or for just a few guests in the present cooker 10. The vertically stacked drawers 42 and grill grates 13 furnish a substantial amount of grill space, even though the footprint of the generally cylindrical shaped cooker 10 (on the ground) is small. Each cooking drawer 42 opens independently, which is convenient for placing the food items on the grill grate 13, checking, basting, or topping the food items in the drawer, and removing particular cooked food items from the cooking drawer. The cooker 10 employs these several cooking drawers 42 instead of a single door. It is believed that opening a cooking drawer permits much less steam and/or heat to escape than would opening a single, long door.

Racks may be employed in the versatile cooker 10 to support meat ribs in a vertical position for more thorough cooking of a large number of meat ribs, if desired. Different types of food items can be segregated in the cooker 10. For example, one type of meat (e.g., pork) can be segregated in a different cooking drawer 42 from another type of meat (e.g., beef). Similar types and cuts of meat can be cooked in different cooking drawers, if desired, to suit guests with different cooking level preferences, i.e., meat can be cooked "rare" in an upper cooking drawer 42, while at the same time the same type of meat can be cooked in a lower drawer 42c for those guests who prefer their meat "well done". In such a case, the guests can nevertheless all be served at once. If desired, cuts of meat can be seared on the lowest grill grate 13, and then moved up higher in the cooker 10 (e.g., on an upper drawer grate) for finishing. A user may chose to remove the cooker lid 14 and use only the uppermost grill grate 13 like a grill, without using the cooking drawers.

The verticality of the cooker 10 makes use of the natural tendency of heat to rise, so cooking is efficient. Smoke and heat proceed from the heat source in the burn chamber 36 up through the cooking drawers 42 and the upper warming portion 11. During cooking, drippings from meat cooking on a higher grate 13 may drip down onto and baste meat on a lower grate 13 in the cooker 10. After cooking, the user can open the cooking drawers 42 and/or cooker lid 14, remove the grill grates 13, and clean them. The user can also remove and clean the cooker lid 14.

Each cooking drawer 42 includes a drawer cutout 44 as seen in FIGS. 2 and 5. With the drawer cutout 44 at the rear of the cooking drawer, the height of the rear 42b of the drawer is between about ¼ and about ½, most preferably about ⅓, the height of the front 42a of the cooking drawer 42. It has been found that the drawer cutout 44 and this height ratio of the drawer rear 42b to the drawer front 42a permits heat and smoke to circulate behind the cooking drawer 42 so meat or other food items in the drawer are evenly cooked, while preventing air from escaping through the higher drawer front 42a. The tall front 42a (see FIG. 2) helps to retains heat when the cooking drawer 42 is opened and then closed. The heat and smoke circulate in the small space between the rear of the cooking drawers 42 and the inside of the rear skin 45. For example, if the drawer front 42a is about six (or seven) inches in height, the same drawer at its rear 42b will be about two inches in height. It has been found herein that a two inch or so rear drawer height is sufficient to hold a grill grate 13, even with food loaded on it.

The cooker 10 holds a number of the generally circular-shaped grill grates 13, preferably three or four same sized grill grates, including at least one grill grate for each cooking drawer (see FIGS. 2-4). Grill grates 13 are most preferably between about 16 and about 20, most preferably about 18 inches in circumference to correspond with the most preferred size of cooking drawer 42 at its open bottom. The grill grate 13 seen in FIGS. 2-4 includes spaced apart, substantially parallel grate ribs 34. As seen in FIGS. 4 and 5, the ends of the grate ribs 34 are attached to a ring-shaped grill grate base 48 around the circumference of the grill grate 13. The grill grates 13 can be made of stainless steel.

Each cooking drawer 42 supports one removable grill grate 13. When in place in the cooker 10, each grill grate 13 extends across the bottom of the otherwise bottomless drawer 42. Smoke and heat pass up through the spaces between the grate ribs 34 from the burn chamber 36 below and cook food on the grill grates 13, or in the cooker 10 while it is in use.

Grill grates 13 are placed on grill support devices 17 in the upper warming portion 11, and/or the cooking drawers 42, as desired. The vertical food cooker 10 can also be used without grill grates. When all the grill grates 13 are in place in the cooker 10, they are substantially parallel to one another. The grill grate 13 in the upper warming portion 11 is above, and spaced apart from, the spaced apart grill grates 13 in the cooking drawers 42. The upper warming portion 11 is above the vertically stacked cooking drawers, and the cooking drawers 42 are above the burn chamber 36. Thus, the cooker 10 is "vertical".

The substantially vertical food cooker 10 includes the cooker base portion 30, which is beneath the mid portion 40, which is beneath the upper warming portion 11. As depicted in FIG. 2, the base portion 30 of the cooker 10 includes a substantially cylindrically shaped burn chamber 36 and a substantially planar and circular-shaped fire pan 70. The fire pan 70 includes a number of spaced apart fire pan apertures 71. The burn chamber 36 is bottomless when the fire pan 70 is removed for cleaning. The fire pan should only be removed after cooker 10 is completely cooled off. When the cooker lid is off, the empty cooker 10 can be flushed using a hose, if desired. The fire pan can be removed by opening the cooking drawer or drawers 42, inserting a hook or hangar device through some of the fire pan apertures 71, and lifting the fire pan 70 out.

Food items on the grill grates 13 are cooked by heat and/or steam within the closed cooker. The heat and smoke are emitted from a charcoal fire or other heat source on the fire pan 70. Ash from fires built on the fire pan 70 falls through the fire pan apertures 71, preferably to a fire-proof container that has been placed on the ground under the cooker.

The fire pan 70 is preferably supported on lower brackets 37b, which are seen in hidden line beneath the fire pan 70 in FIG. 2. The base portion 30 preferably includes two sets of three or four lower support brackets 35, 37, one set above the other. The lowest set of support brackets 37 supports the fire pan 70, and the set of brackets 35 above it on the inside wall of the cooker supports a lowermost grill grate 13, if desired. The brackets 35, 37 within a vertical food cooker 10 can be identical to one another, or different from one another.

The grate brackets 35, 37 are preferably generally L-shaped in transverse cross-section, the horizontal branch of the "L" shape being the generally horizontally oriented section and the vertical branch of the "L" shape being the generally vertically oriented section 19. Preferably, the generally vertically oriented section 19 of each of three or four evenly spaced, same sized grate brackets 35, 37 is attached to the inner side wall, so the grate brackets 35, 37 occur at a relatively even height about midway down the wall of that portion or cooking drawer. The removable grill grate 13, or fire pan 70, rests on, or contacts, the outwardly extending, generally horizontally oriented section 18 of each of the spaced apart grate brackets 35, 37 while the cooker 10 is in use. The low profile, generally horizontally oriented sections 18 preferably extend out about ¼ inch to about one inch into the central space from the inside wall around the inner periphery of each portion or drawer.

A removable, fire proof bowl can optionally be placed on the lowermost grill grate 13, which may be in the base portion 30 or in the lowermost cooking drawer 42c. The fire proof bowl preferably holds wet chips of a preferred wood, such as hickory, oak, apple, cherry, or peach wood. Smoke from the wood chips imparts a special flavor to the food items being cooked above them in the cooker 10. Alternatively, the fire proof bowl can be partially filled with water. The heat from the fire below the bowl boils the water in the bowl, forming steam that can be used to cook food items, such as oysters, in the cooking drawer 42 or drawers above the steam bowl. Alternatively, pieces of lemons or oranges, apple juice, beer, or liquid smoke can be placed in the bowl for flavoring meat cooking above it. The word "cooker" herein is meant to include "smoker", since smoking also cooks the meat or other food being cooked. The cooker 10 is often used for smoking, or barbecuing, various cuts of meat.

Importantly, the base portion 30 further includes an adjustable base damper 36 in a side wall of the burn chamber 36. The damper 38 (draft) is opened or closed partially or fully as a means of controlling the amount of burn in the burn chamber 36 while the cooker 10 is in use. To use a preferred damper herein, the user grasps a damper handle 43 on the damper 36 and moves it to slide fan-shaped segments of the damper 38 open or closed. Controlling draft with the damper 38 controls the burn rate and direct heat temperature in the cooker, as well as the smoke emission rate. By coordinating the opening and closing of the upper air vent 26 and the base damper 38, the user can control cooking time and temperature, as well as meat flavor through smoke control. For example, if the user determines that the interior temperature according to the temperature gauge 28 is too hot, the damper 38 can be closed partway, and the upper air vent 26 can be opened to dissipate some of the interior heat. Closing both is believed to deprive the charcoal of air, which causes the fire to go out and eventually halts the cooking process. Once food in the cooker 10 has cooked sufficiently, the damper 38 can be closed to cause the cooking process to slow and then stop.

The base portion 30 further includes at least three, and preferably four, support legs 50 for supporting the rest of the cooker 10. The upper end of each support leg 50 is attached to a bottom section of the base portion 30. The cooker 10 is preferably placed on a relatively flat surface. The support legs 50 are preferably not angled widely away from the base portion 30, so that they do not pose a tripping hazard and so the cooker footprint is kept small.

As illustrated in FIGS. 2 and 4, the substantially vertical cooker 10 includes a drawer opening and closing mechanism 55. This allows a user to independently open each cooking drawer 42 wide enough to place the meat or other food items on the grill grate 13, but not so wide that a loaded drawer might break over time. The drawer opening/closing mechanism 55 includes a hinge pin 56, which is enclosed in a hinge pin channel 57 on an inside wall of each cooking drawer 42, as shown in FIG. 2. The hinge pin can be an oil-free bearing. The cooking drawer 42 pivots on the hinge pin 56 when the drawer is opened.

When the cooking drawer 42 is opened (see FIG. 4) to its maximum acceptable position, the outside of the drawer strikes the closest rail 16a, which is on the outside of the cooker. The stop rail 16a is a sufficient number of inches away from the hinge pin 56 to cause this to happen. The preferred distance between the hinge pin 56 and the stop/nearest rail 16a is about ½ the distance between the nearest rail 16a and the rail 16 on the opposite side of the cooker 10, which neighbors the stop rail. When the cooking drawer 42 strikes the stop rail 16a, continued forward motion of the drawer is stopped and the drawer is prevented from swinging all the way out. As seen in FIG. 1, the stop rail 16a is on the right side of the cooker 10 as the cooker is viewed from the front, while the drawer handles 59 are on the left of the cooker as it is viewed from the front. Since the stop rail 16 is generally vertically oriented, and each stacked drawer 42 opens in a generally horizontal direction, each drawer will strike the same stop rail 16a as it swings open.

The drawer opening/closing mechanism 55 also includes a drawer handle and latch mechanism 58 on the side of each cooking drawer 42 opposite the hinge pin 56. While the hinge pin 56 is adjacent the stop rail 16a on one side of the cooker 10, the drawer handle and latch mechanism 58 is adjacent the rail 16 on the other side of the cooker, so the cooking drawer slides open from between the two front rails. The drawer handle and latch mechanism 58 includes a drawer handle 59 and a drawer latch 60. The drawer handle 59 is preferably made of a material that does not retain heat, such as wood. The rail 16 adjacent the drawer handle and latch mechanism 58 includes spaced-apart rail knobs 64 on the outside of the rail, as seen in FIG. 2. The drawer latch 60 includes a spring-loaded ball 61 (see FIG. 4). The location of each spring-loaded ball 61 of a drawer latch 60 corresponds to the location of a rail knob 64 on the adjacent rail, so each spring-loaded ball 61 contacts a rail knob 64 when the drawer 42 is closed.

When the drawer handle 59 is lightly pulled, tension is released and the drawer latch 60 opens. This causes the spring loaded ball 61 to push out, which releases the tension and unlatches the drawer 42, allowing it to swing open. After use, the cooking drawer 42 is swung closed, and the latch 60 latches. The tension in the spring behind the ball 61 retains the cooking drawer in the closed position until it is opened again. The drawers 42 open independently of one another, as seen in FIG. 2. The drawer handle and latch mechanism 58 permits each drawer 42 to be opened with one hand, leaving the user's other hand free for other tasks.

Thus, the vertical food cooker 10 includes: 1) substantially cylindrical cooking drawers 42 that open independently for fuel efficiency and segregation of food items; 2) rails 16 for supporting the cooking drawers 42 and cooker 10 and for stopping cooking drawers as they are opened; and 3) the hinge pin 56 and efficient drawer handle and latch mechanism 58 for smoothly and independently opening the cooking drawers 42; 4) the grill grates 13 are removable for versatility in using the central space of the cooker 10; and 5) the grate lips 67 are sufficiently sturdy to support loaded grill grates 13, but have a low profile for those occasions when one or more grill grates 13 are removed to accommodate larger food item(s) in the central space of the cooker 10. Other than the vent 26 and damper 38, there are no other openings to the outside when the cooking drawers 42 are closed. This enables steam and heat to build up and be steadily maintained in the cooker 10 when it is in use.

The substantially cylindrical-shaped cooker 10 does not have a door. Instead of opening a door to a compartment, the entire cooking drawer swivels out, displaying any food items in the drawer. The side walls of the cooking drawer enclose and support the grill grate. The grill grate support device is not a sideways drawer channel as is found on the opposite long sides of a conventional kitchen-type drawer. There is therefore no struggle to seat guides on the long sides of the conventional drawer into such sideways channels. The grill grates 13 are simply dropped down onto the grate brackets 35 from above once the particular cooking drawer 42 swivels open, or in the case of the uppermost grill grate 13, when the cooking lid 14 is removed.

Figure 6:
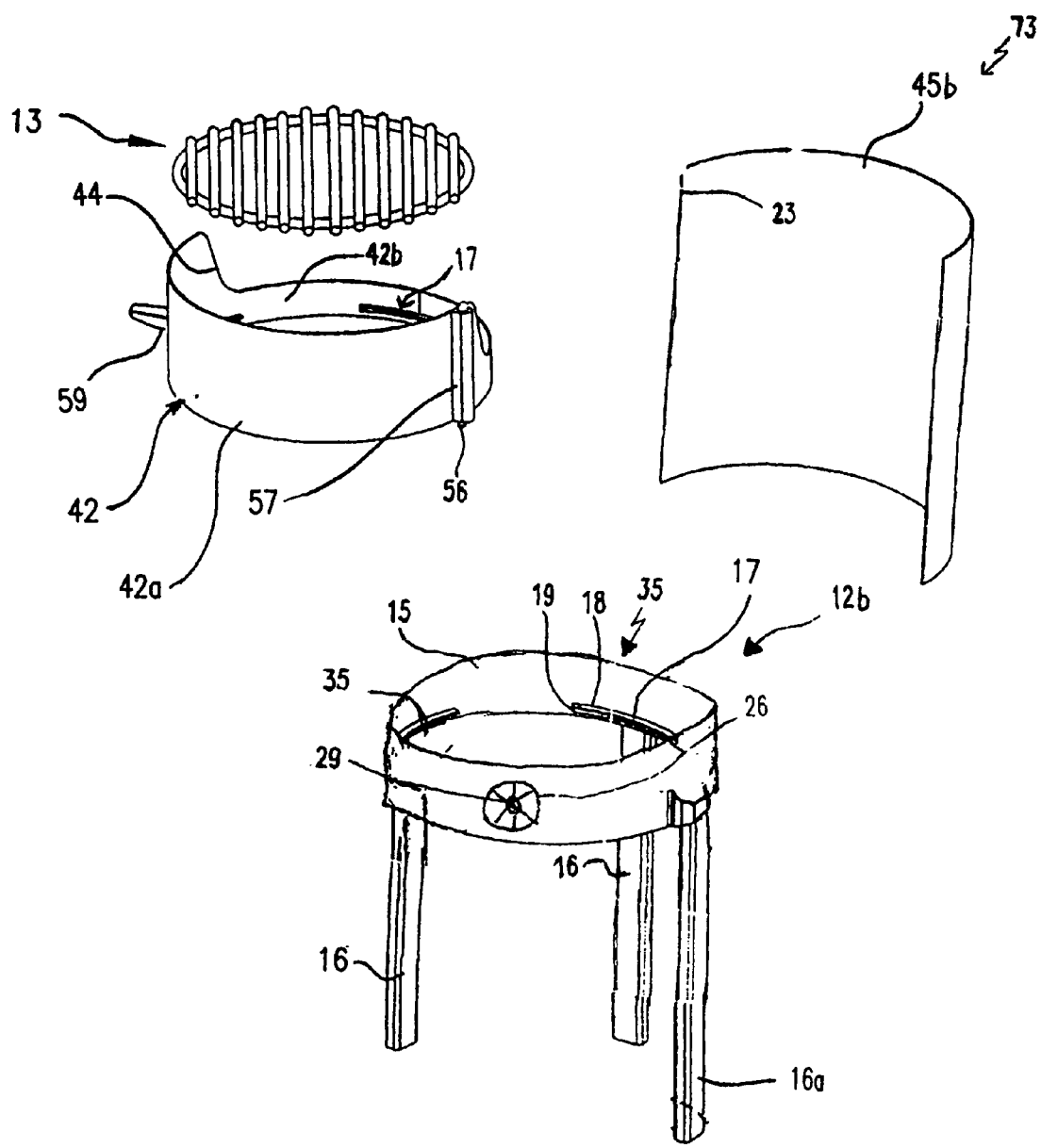
FIG. 6 is a perspective view of an add-on kit for an expandable vertical food cooker according to the present invention.
Figure 7:
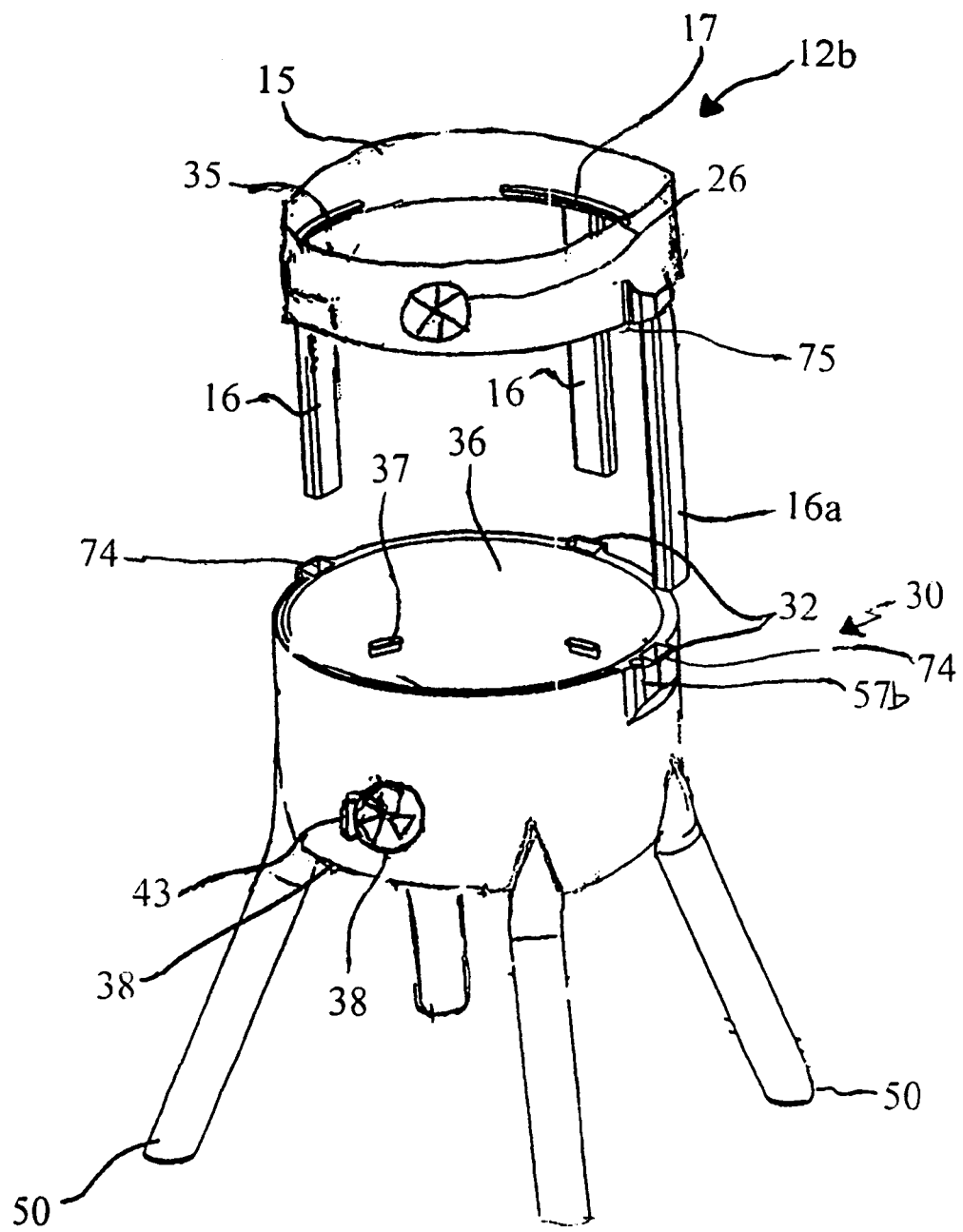
FIG. 7 is a perspective view of a support frame and a base portion of an expandable vertical food cooker according to the present invention.
Figure 8:
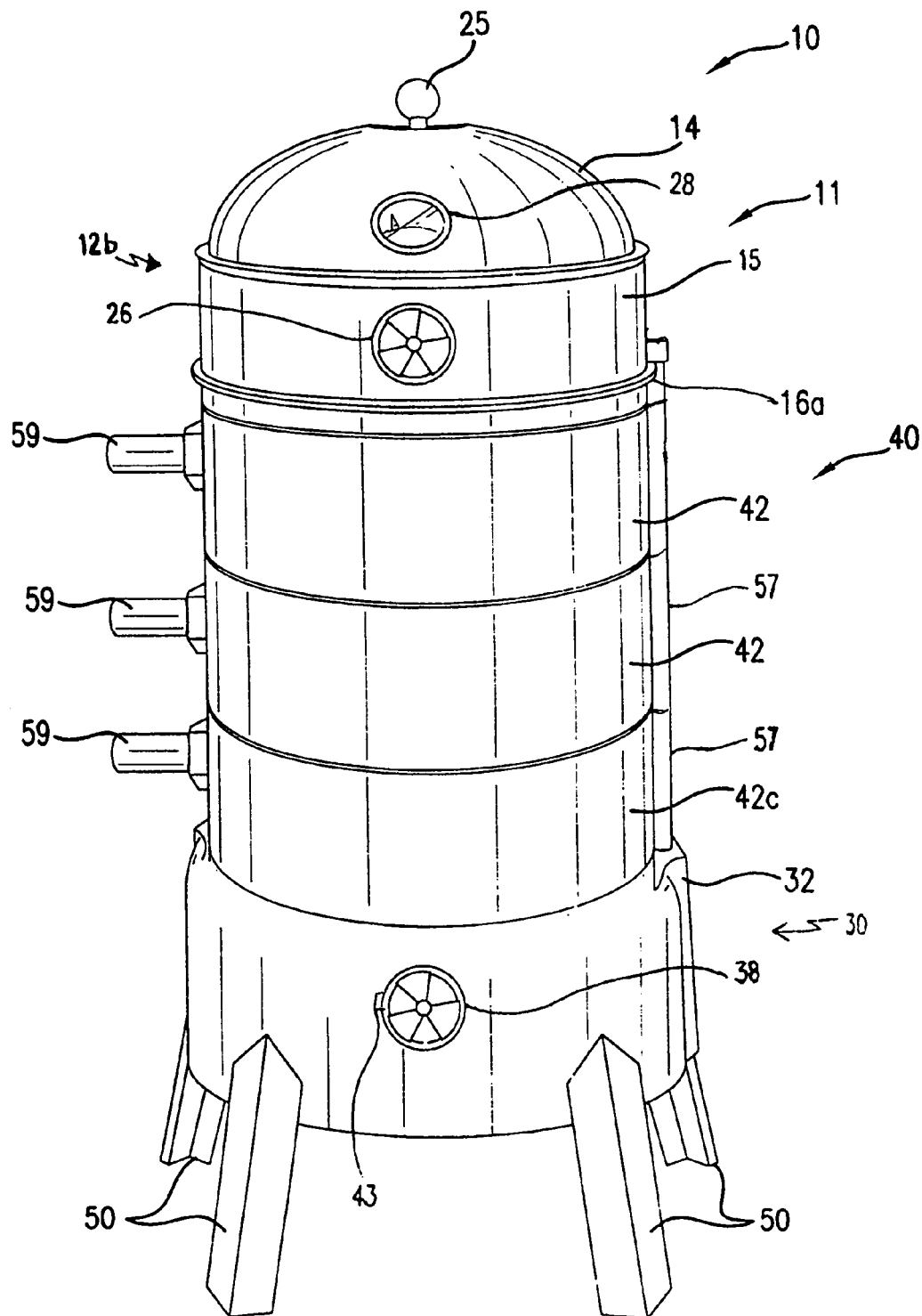
FIG. 8 is a perspective view of an expandable vertical food cooker according to the present invention.

FIGS. 6 through 8 show an expandable vertical food cooker 10. The vertical food cooker 10 is partly detachable so that it can be expanded for cooking more food. The user can choose to partially disassemble the base unit cooker 72 and then add a cooking drawer or two, as needed. For everyday use, for example, the user might choose to employ a one or two drawer base unit cooker 72. Then, for a party or the like, the user can increase the capacity of the cooker using a one or two cooking drawer add-on kit 73. The user can purchase both the base unit cooker 72 and an add on kit 73 at the outset, or the user can purchase a base unit cooker 72 at the outset and build onto it in a year or two by purchasing an add-on kit or two to meet greater demand in the household or commercial kitchen (e.g., to serve additional family members or guests).

As seen in FIG. 6, the cooker add-on kit 73 for the expandable vertical food cooker comprises: a cooking drawer 42, a grill grate 13, and a second rear skin 45b: (a) a support frame 12b, a grill support device 17 being attached to the support frame 12b, the support frame 12b comprising a substantially cylindrical-shaped upper collar 15 and at least two, and preferably three, spaced apart rails 16 attached to and extending generally downward from the upper collar 15; (b) one or more cylindrically shaped, open-bottomed cooking drawers 42, each cooking drawers 42 comprising a grill support device 17 on an inside wall of the cooking drawer 42, each cooking drawer 42 comprising the substantially vertically oriented hinge pin channel 57 on a wall of the cooking drawer 42, the hinge pin channel 57 supporting a hinge pin 56 within the hinge pin channel 57, an end of the hinge pin 56 protruding from the hinge pin channel 57; (c) one or more removable grill grates 13 supportable on the grill support device 17, and (d) a cooker rear skin 45.

A two drawer add-on kit 73 comprises a taller support frame 12b than a one drawer add-on kit, two cooking drawers 42, two removable grill grates 13, and a third, wider rear skin 45b that is wider than the rear skin of the one drawer add-on kit. The base unit cooker 72, which may include between about one and five cooking drawers 42, is as described hereinabove. A two drawer base unit cooker 72, for example, corresponds to FIG. 5. The add-on kit support frame 12b is taller (i.e., the rails are longer) than the base unit support frame 12 because more cooking drawers 42 are being added to expand the cooker unit. Since the kit support frame 12b must also accommodate the base unit cooking drawers 42, the length of the rails 16 of the kit support frame 12b exceeds the collective height of the cooking drawers 42 in the kit.

To add cooking drawers using the cooker add-on kit 73, the grill grates 13 and the cooker lid 14 are removed from the base unit cooker 72. The base unit support frame 12 is then removed by pulling it upward. The ends of the three rails 16 of the support frame 12 are pulled out of the three corresponding holes 74 in the rail attachment sections 32 (see FIG. 7). The lowermost cooking drawer 42c is then stacked on the upper edge of the burn chamber 36. The lower end of the hinge pin 56 (see FIG. 6) fits into the hinge pin channel hole 57b in the lower end of the hinge pin channel (see FIG. 7). The cooking drawers 42 of the add-on kit 73 are interchangeable with the drawers 42 of the base cooker unit 72, so the cooking drawers can be placed in any order in the expanded cooker unit. The second cooking drawer 42 is then placed on the top of the first, lowermost cooking drawer 42c. The lower end of the hinge pin 56 of the cooking drawer above fits into the upper end of the hinge pin channel 57 of the cooking drawer below. Third, fourth, and fifth cooking drawers 42, as desired, are stacked in this manner.

The add-on kit rear skin 45b is then placed over the outside of the cooking drawers 42 in the rear of the cooker. The rear skin 45b is wide enough to cover all of the cooking drawers. Although the add-on kit rear skins 45b, c vary in width to accommodate different numbers of cooking drawers 42 (from between two and six drawers), they are the same length as one another and as the base unit rear skin, so that they extend between the two opposite rails 16.

The add-on kit support frame 12 is then placed on the uppermost cooking drawer 42, with a protrusion 75 on the lower edge of the upper collar 15 of the add-on kit support frame fitting into the upper end of the hinge pin channel 57 of the uppermost cooking drawer 42. The lower edge of the upper collar 15 lies along the upper edge of the uppermost cooking drawer. The protrusion 75 is the same size as the end of the hinge pin, so that it fits closely into the hinge pin channel of the uppermost cooking drawer 42.

Figure 9:
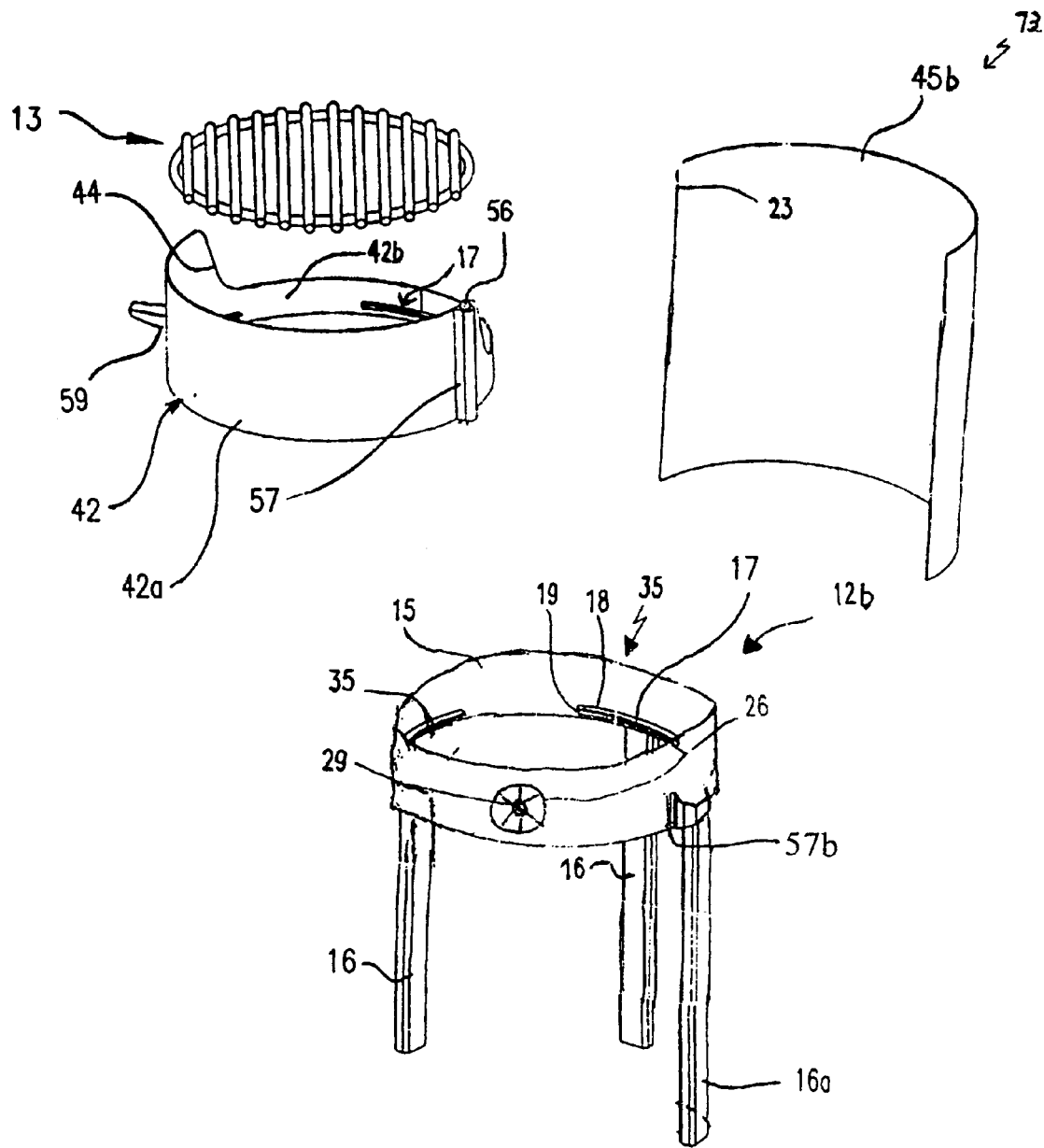
FIG. 9 is a perspective view of an add-on kit for an expandable vertical food cooker according to the present invention.
Figure 10:
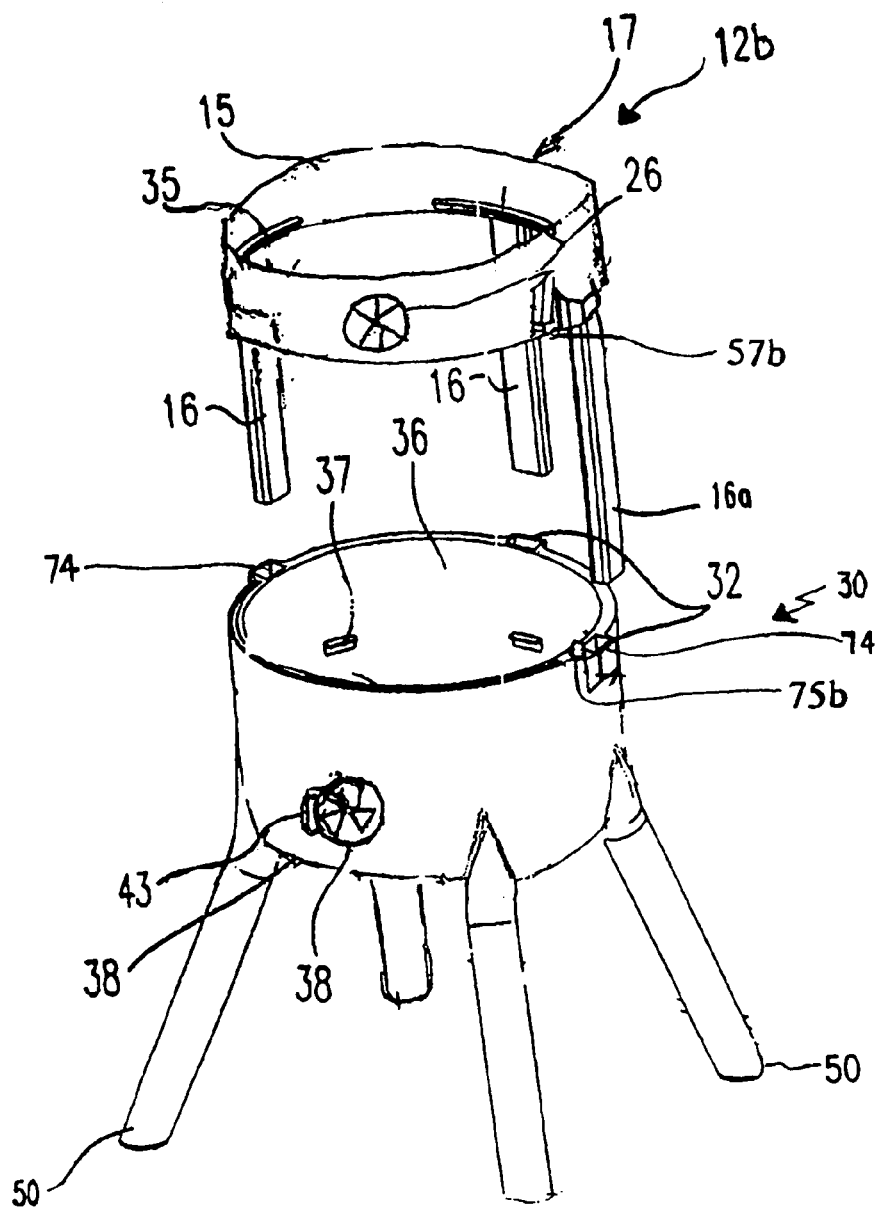
FIG. 10 is a perspective view of a support frame and a base portion of an expandable vertical food cooker according to the present invention.

Alternatively, the hinge pin 56 extends up from the top of the hinge pin channel 57 as seen in FIG. 9 in each cooking drawer 42, instead of from the bottom of the hinge pin channel. In this alternative, the base portion 30 of the cooker base unit 72 includes a protrusion 75b as seen in FIG. 10, which is like the hinge pin channel protrusion 75 from the upper collar 15 seen in FIG. 7, except that the lower protrusion 75b extends up from an edge of the base portion 30 adjacent the rail 16a. Also in this expandable cooker 10, the end of the hinge pin channel with its hole 57b for receiving the end of the hinge pin 56 is inverted on the upper collar 15 as seen in FIGS. 9 and 10, rather than on the base portion 30 as seen in FIG. 7. In the cooker add-on kit 73 and cooker base portion 30 shown in FIGS. 9 and 10, respectively, when the lower edge of the upper collar 15 is placed on the upper edge of the uppermost cooking drawer 42, the top of the hinge pin 56 on the drawer extends into the hinge pin hole 57b on the upper collar 15. In both cases, the hinge pin channel protrusion 75 and hinge pin hole 57b are substantially aligned with one another at opposite ends of the hinge pin channel 57.

The rails 16, which extend down from the upper collar 15, slide over the outside walls of the cooking drawers 42 when the support frame is added to the cooker during assembly. The stop rail 16a lies alongside the hinge pin channel 57 on the stacked cooking drawers 42. The two opposite rails 16, 16a also extend over the opposite side edges 23 of the rear skin 45. The length of the rear skin 45 therefore approximates the distance between the two opposite rails 16, 16a. The lower ends of the rails 16 are inserted into the corresponding holes 74 in the rail attachment sections 32 of the base unit cooker's base portion 30. The hinge pins are preferably oil free bearings.

The grill grates 13 and the cooker lid 14 are replaced on the expanded cooker unit, which is seen in FIG. 8. The drawer handles 59 are preferably simple wooden handles attached to the side of each cooking drawer. The drawer handles are preferably stacked above one other as seen in FIG. 8.

Thus, the expandable vertical food cooker 10 includes: (a) an open-bottomed upper warming portion 11 comprising: a removable support frame 12, a grill support device 17 attached to the support frame 12, an adjustable upper air vent 26, and an openable cooker lid 14 on top of the cooker, the support frame 12 comprising a substantially cylindrical-shaped upper collar 15 and at least two spaced apart rails 16 extending generally downwardly from the upper collar 15; (b) a cooker base portion 30 beneath the upper warming portion 11, the base portion 30 comprising: a substantially cylindrically shaped burn chamber 36, an adjustable base damper 38 in the burn chamber 36, a grill support device 17 in the burn chamber 36, a substantially planar fire pan 70 at a bottom of the burn chamber 36, and at least three support legs 50 on the bottom of the cooker 10; (c) a cooker mid portion 40 between the upper warming portion 11 and the base portion 30, the mid portion 40 comprising between about one and about six substantially cylindrically shaped, open-bottomed, stackable cooking drawers 42, as described herein; and (d) one or more removable grill grates 13,each of which is supportable on one of the grill grate devices 17. The grill grate device 17 is preferably a set of grate brackets 35.

Each of the independently openable cooking drawers 42 in the expanded cooker 10 comprises a grill support device 17 within the cooking drawer 42. The cooking drawers 42 are detachable from one another and interchangeable with one another. Each of the cooking drawers 42 includes the substantially vertically oriented hinge pin channel 57 on the cooking drawer 42, and a substantially vertically oriented hinge pin 56 within the hinge pin channel 57, as described herein. An end of the hinge pin 56 protrudes from the top or bottom of the hinge pin channel 57.

The expandable vertical food cooker 10 further includes a removable rear skin 45 at a rear of the cooker extending behind/outside the cooking drawers 42 and inside the rails 16. The length of the rear skin 45 is preferably about the same as a distance between the two rails 16, and a width of the rear skin 45 is about equal to a height of the cooking drawers 42 stacked in the cooker.

In the expandable cooker 10, the cooker base portion 30 and the upper collar 15 each comprise either a hinge pin hole 57b, or a protrusion 75 insertable in the corresponding hinge pin channel 57 of an adjacent one of the cooking drawers, the end of the hinge pin 56 being insertable in the hinge pin hole 57b. Each expandable cooker has both the hinge pin channel protrusion 75 and a hinge pin hole 57b, which are normally aligned. When the expanded cooker 10 is assembled, the hinge pin channels 57 on the cooking drawers 42 are aligned, and the hinge pin channel protrusion 75 and hinge pin hole 57b are aligned at either end of the whole hinge pin channel 57. The stop rail 16a ordinarily is adjacent the hinge pin channel 57.

The base unit support frame 12 and rear skin 45 are stored and used later when and if the user wishes to reduce capacity of the vertical food cooker 10. The steps outlined herein are also followed to reduce capacity, except that fewer cooking drawers 42 are put back into the cooker unit 10. When capacity is reduced, the base unit support frame 12, which has rails 16 that are shorter in length, and the shorter base unit rear skin 45 are used in place of the taller add-on kit support frame 12b and wider add-on kit rear skin 45b, which are stored for later use.

From the foregoing it can be realized that the described device of the present invention may be easily and conveniently utilized as a food cooker and warmer. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED IN THE DRAWINGS 10 vertical food cooker
11 upper warming portion
12 support frame
13 grill grate
14 cooker lid
15 upper collar
16 rail
17 grill support device
18 horizontal grate bracket section
19 vertical grate bracket section
23 rear skin side edge
25 lid handle
26 upper air vent
28 temperature gauge
29 upper vent handle
30 base portion
31 lid lip
32 rail attachment point
34 grate ribs
35 upper grate brackets
36 burn chamber
37 lower grate brackets
38 damper
40 mid portion
42 cooking drawer
43 damper handle
44 drawer cutout
45 rear skin
48 grill grate base
50 cooker legs
55 drawer opening mechanism
56 hinge pin 57 hinge pin channel
58 drawer handle/latch mechanism
59 drawer handle
60 drawer latch
61 spring-loaded ball
64 rail knob
70 fire pan
71 apertures in fire pan
72 base unit cooker
73 cooker add-on kit
74 rail attachment hole
75 protrusion

What is claimed is:

1. An expandable vertical food cooker, comprising:
   (a) an open-bottomed upper warming portion comprising: a removable support frame, a grill support device attached to the support frame, an adjustable upper air vent, and an openable cooker lid, the support frame comprising a substantially cylindrical-shaped upper collar and at least two spaced apart rails extending generally downward from the upper collar and insertable into a cooker base portion;
   (b) the cooker base portion beneath the upper warming portion, the base portion comprising: a burn chamber, an adjustable base damper, a grill support device in the burn chamber, and a substantially planar fire pan at a bottom of the burn chamber;
   (c) a cooker mid portion between the upper warming portion and the base portion, the mid portion comprising between one and six substantially cylindrically shaped, open-bottomed, stackable cooking drawers, each of the cooking drawers being independently pivotably openable, each of the cooking drawers comprising a grill support device within the cooking drawer, the cooking drawers being detachable from one another and interchangeable with one another; each of the cooking drawers comprising a substantially vertically oriented hinge pin channel on the cooking drawer, and a hinge pin within the hinge pin channel, an end of the hinge pin protruding from the hinge pin channel; and
   (d) at least one removable grill grate supportable on the grill grate device; wherein the cooker base portion and the upper collar each comprise either a hinge pin hole, or a protrusion insertable in the corresponding hinge pin channel of an adjacent one of the cooking drawers, the end of the hinge pin being insertable in the hinge pin hole.

2. The expandable cooker according to claim 1, wherein the hinge pin channels are aligned, and are adjacent one of the rails of the cooker, the expandable cooker comprising both the hinge pin channel protrusion and the hinge pin hole.

3. The expandable cooker according to claim 2, wherein the hinge pin channel protrusion and hinge pin hole are substantially aligned with one another at opposite ends of the hinge pin channel.

4. The expandable cooker according to claim 1, wherein a bottom end of each rail fits closely into, and is removable from, a corresponding hole in a rail attachment section of the base portion.

5. The expandable cooker according to claim 1, further comprising a removable rear skin extending behind the cooking drawers and within the rails at a rear of the cooker.

6. The expandable cooker according to claim 1, wherein the grill support devices in the support frame, the cooking drawers, and the burn chamber each comprise a set of spaced apart grate brackets attached to an inside wall of the support frame, the cooking drawers, or the substantially cylindrically shaped burn chamber.

\* \* \* \* \*